US012619306B2

(12) United States Patent
O'Callaghan

(10) Patent No.: US 12,619,306 B2
(45) Date of Patent: May 5, 2026

(54) WEARABLE CONTROL SYSTEM AND METHOD TO CONTROL AN EAR-WORN DEVICE

(71) Applicant: Bose Corporation, Framingham, MA (US)

(72) Inventor: Pauline O'Callaghan, Berlin (DE)

(73) Assignee: Bose Corporation, Framingham, MA (US)

( * ) Notice: Subject to any disclaimer, the term of this patent is extended or adjusted under 35 U.S.C. 154(b) by 233 days.

(21) Appl. No.: 18/556,673

(22) PCT Filed: Apr. 21, 2022

(86) PCT No.: PCT/EP2022/060633
§ 371 (c)(1),
(2) Date: Oct. 22, 2023

(87) PCT Pub. No.: WO2022/223741
PCT Pub. Date: Oct. 27, 2022

(65) Prior Publication Data
US 2024/0184361 A1 Jun. 6, 2024

(30) Foreign Application Priority Data

Apr. 21, 2021 (EP) .................................... 21169746

(51) Int. Cl.
*G06F 3/01* (2006.01)
*G06F 3/16* (2006.01)
(Continued)

(52) U.S. Cl.
CPC .............. *G06F 3/014* (2013.01); *G06F 3/016* (2013.01); *G06F 3/017* (2013.01); *G06F 3/167* (2013.01);
(Continued)

(58) Field of Classification Search
CPC .......... G06F 3/014; G06F 3/016; G06F 3/017; G06F 3/167; H04R 1/1041; H04R 5/033;
(Continued)

(56) References Cited

U.S. PATENT DOCUMENTS

| | | | |
|---|---|---|---|
| 2009/0096746 A1* | 4/2009 | Kruse ..................... | G06F 3/016 340/407.1 |
| 2010/0169097 A1 | 7/2010 | Nachman | |

(Continued)

FOREIGN PATENT DOCUMENTS

| | | |
|---|---|---|
| EP | 2811389 | 12/2014 |
| EP | 3370442 | 9/2018 |

(Continued)

*Primary Examiner* — Vivian C Chin
*Assistant Examiner* — Con P Tran

(57) ABSTRACT

The invention is related to a wearable control system (1) configured to control an ear-worn device (5). The wearable control system (1) comprises at least a first processor (71) configured to execute a computer programme, comprising instructions related to a plurality of user-selection elements, and to receive a user input. The wearable control system (1) comprises a wearable remote-control device (10, 12) comprising a wireless interface configured to communicate with the ear-worn device (5), and a user interface comprising at least one sensor (20) configured to sense an operation of a user and configured to output a signal indicative of the detected operation. The first processor (71) is further configured to receive the signal from the user interface and to convert the signal from a user input to generate and transmit an information on a state of a user-selection element and causing the ear-worn device (5) to present that information to the user (100) by auditory display being indicative of the state of the at least one user-selection element.

15 Claims, 13 Drawing Sheets

Figures 1, 1A, 1B:
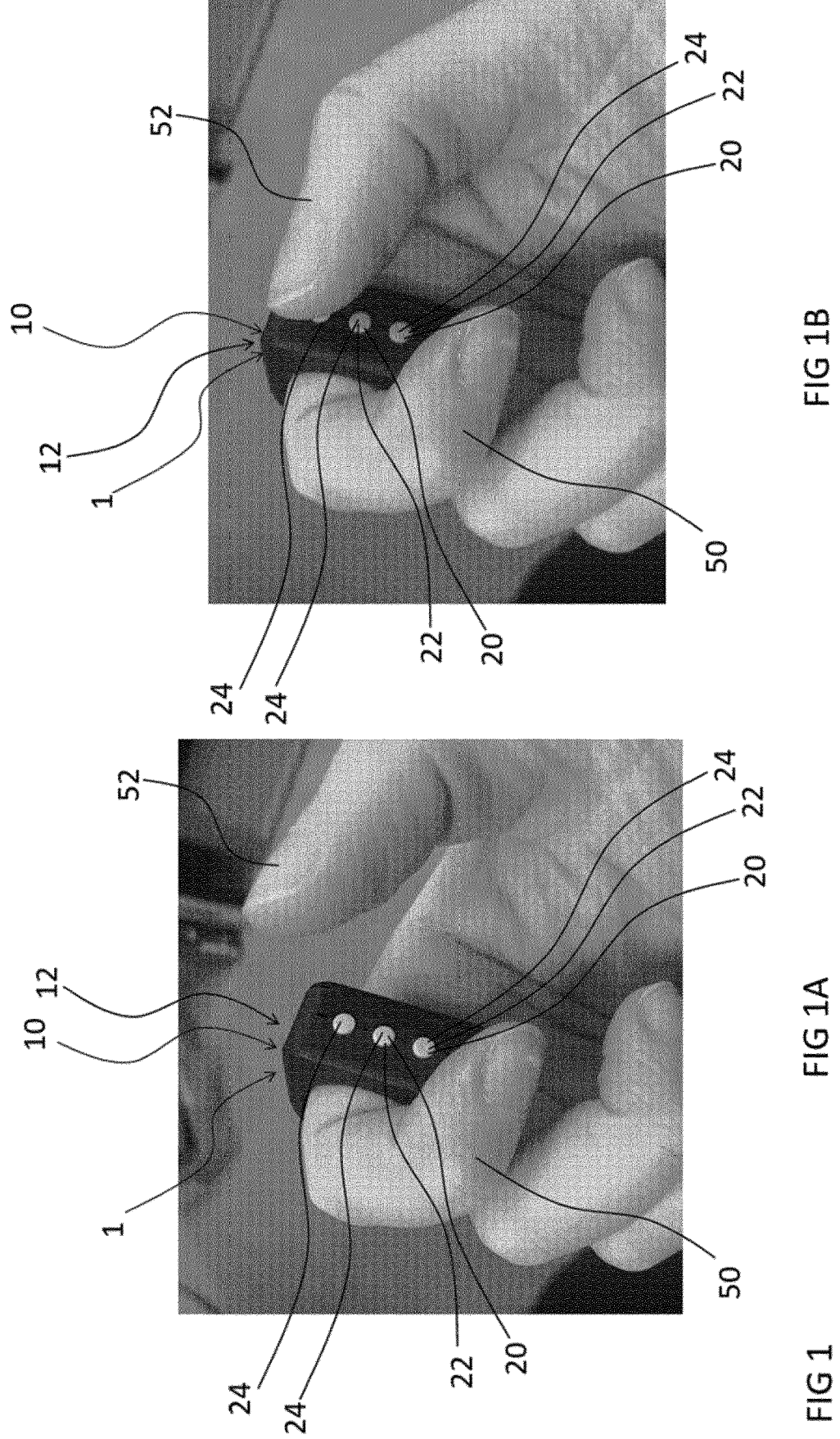

(51) Int. Cl.
     *H04R 1/10*            (2006.01)
     *H04R 5/033*         (2006.01)
     *H04S 7/00*           (2006.01)

(52) U.S. Cl.
     CPC ........... *H04R 1/1041* (2013.01); *H04R 5/033*
           (2013.01); *H04R 2420/07* (2013.01); *H04S*
           *7/302* (2013.01); *H04S 2400/11* (2013.01)

(58) Field of Classification Search
     CPC .. H04R 2420/07; H04S 7/302; H04S 2400/11
     USPC .................. 381/310, 315, 58, 74, 374, 312;
                    340/4.11, 4.12, 4.13; 455/355
     See application file for complete search history.

(56) References Cited

U.S. PATENT DOCUMENTS

| | | | | |
|---|---|---|---|---|
| 2013/0322670 | A1* | 12/2013 | Hosoi .................... | H04R 1/028 |
| | | | | 381/315 |
| 2016/0299570 | A1* | 10/2016 | Davydov ................ | G06F 3/167 |
| 2019/0028134 | A1* | 1/2019 | Barnett, Jr. ........... | H04B 1/385 |
| 2021/0055697 | A1* | 2/2021 | Abramov .............. | G04G 21/00 |

FOREIGN PATENT DOCUMENTS

| | | |
|---|---|---|
| WO | 2014153372 | 9/2014 |
| WO | 2015165162 | 11/2015 |

* cited by examiner

FIG 3
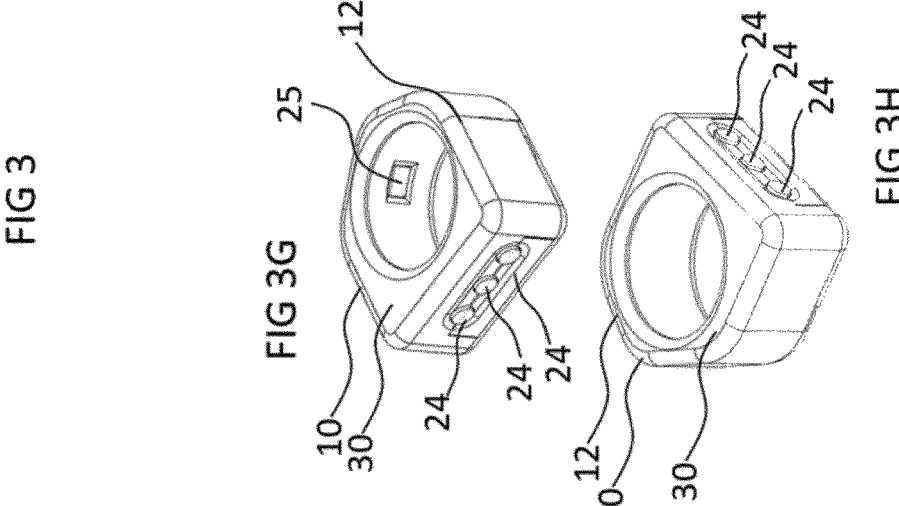
FIG 3G
FIG 3H
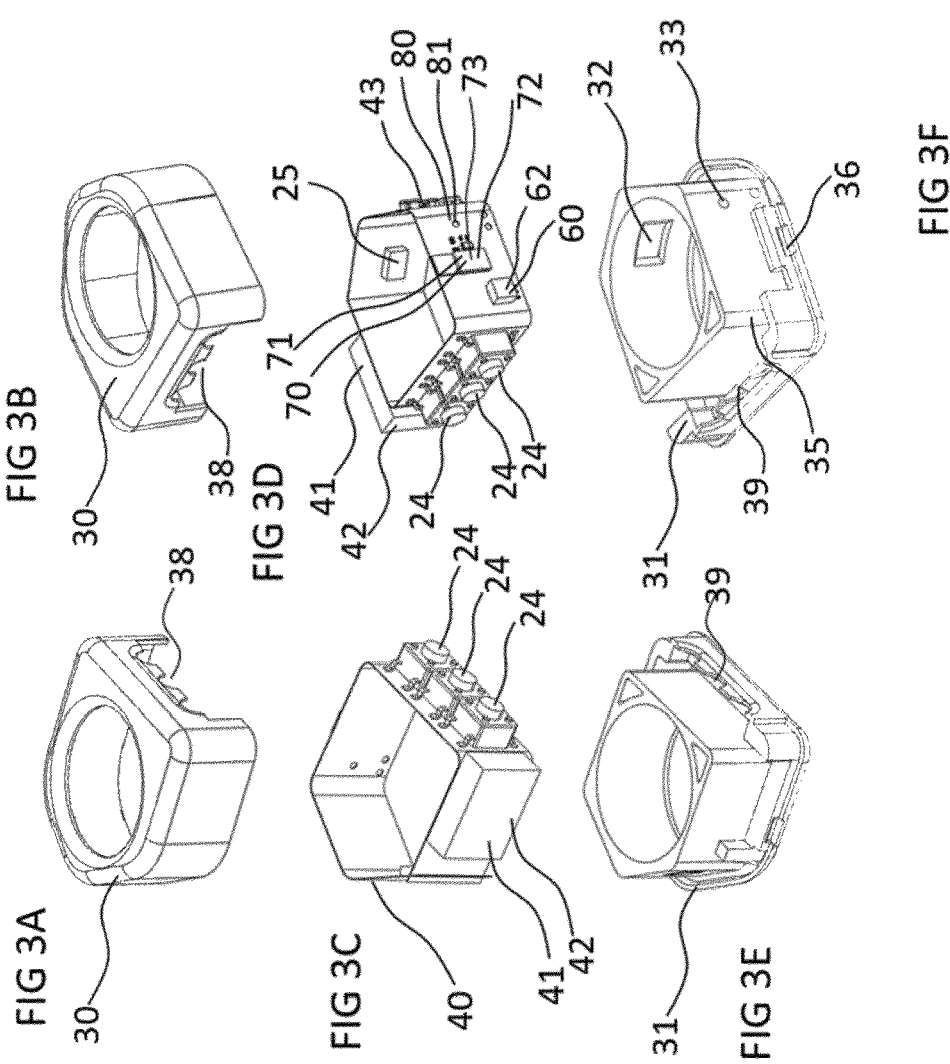
FIG 3A
FIG 3B
FIG 3C
FIG 3D
FIG 3E
FIG 3F FIG 5
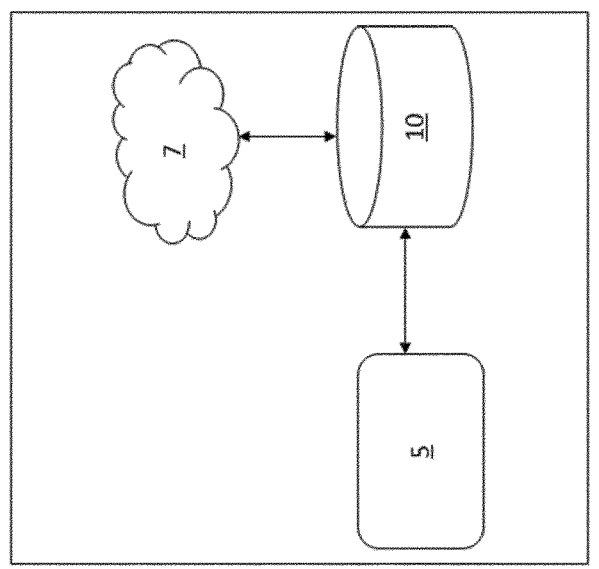
Fig 5C
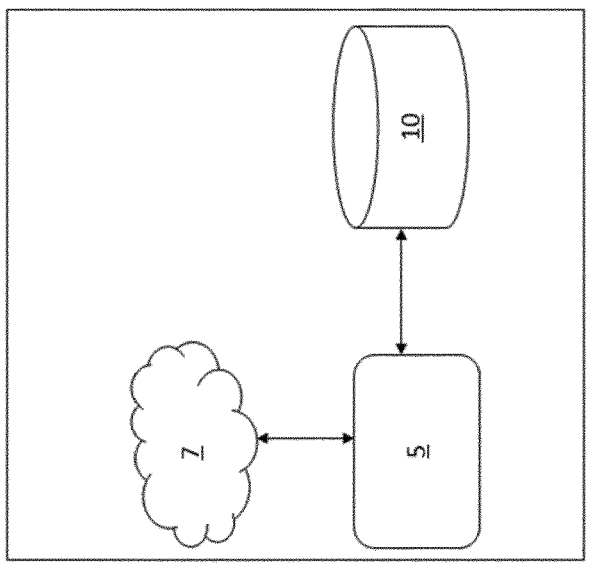
FIG 5B
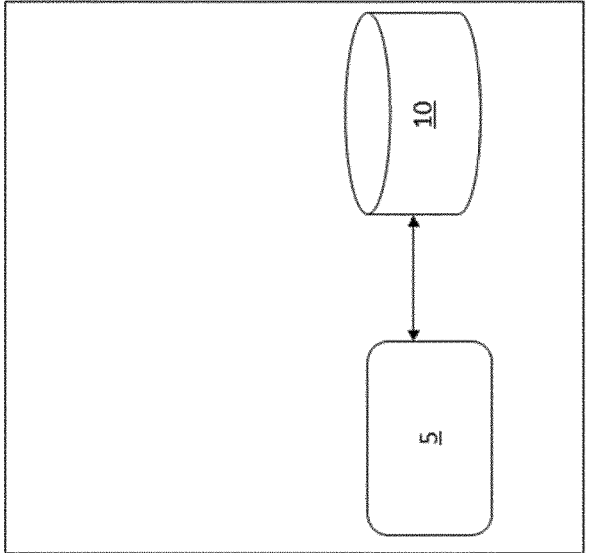
FIG 5A

WEARABLE CONTROL SYSTEM AND METHOD TO CONTROL AN EAR-WORN DEVICE

CROSS-REFERENCE TO RELATED APPLICATION

This is the U.S. National Stage of International Patent Application No. PCT/EP2022/060633 filed Apr. 21, 2022, which claims priority to European Patent Application Ser. No. 21/169,746.1 filed Apr. 21, 2021.

The invention relates to a wearable control system to control an ear-worn device. Further, the invention teaches a method to control the ear-worn device. Additionally, the invention relates to an associated computer programme.

Ear-worn devices are widely used and used in different areas. For instance, an ear-worn device can be a true wireless earbud, a hearable, a hearing aid or an industrial headset. A well-known limitation of current ear-worn devices is a poor user interface, such that the functions are limited and/or the handling is difficult.

Users of hearing aids have long bemoaned the lack of control they have over their devices; this is usually limited to a single physical switch on the hearing aid to choose between 2-3 pre-set hearing profiles. Modern digital hearing aids sometimes employ a smartphone application to give users more control over their devices, but this requires removing the user from the environment to look at the phone. This can be inconvenient, for example when struggling to hear someone in a noisy bar and needing to adjust hearing settings.

Some hearing aid companies offer remote control devices similar in appearance and functionality to TV remotes or electronic car keys. These devices are limited in functionality and can be inconvenient to carry and access quickly.

With the recent proliferation of wireless earbuds in the consumer market, user interface issues have been at the forefront of product reviews. Earbuds with tactile buttons can cause discomfort as pressing these buttons pushes the whole device against the inside of the ear. Touch sensors on earbuds are plagued by false positives and unintentional activation, e.g. accidentally hanging up a call when adjusting the position of the earbud in the ear. Force sensors or well-placed buttons, e.g. requiring the use of the index finger and thumb squeezing together to activate, have proved to be the most popular solution, however the lack of real estate on an ear-worn device usually limits the manufacturer to 1-3 buttons, corresponding to limited functions (e.g. pause, play, activate noise cancelling). Often the buttons require 'double tap' or 'press and hold' actions, slowing down the interaction for the user.

As with hearing aids, wireless earbud manufacturers often provide an accompanying smartphone application to allow more advanced control of the earbuds. In addition to this earbud control application, the user is likely to interact with multiple other smartphone applications when using the earbuds, e.g. to change the song or to find the place in an audiobook. Each of these interactions requires the user to take out the smartphone and look at it, often removing himself/herself from the current environment, e.g. while out on a run or in a 'flow' state while working.

Increasingly, the user interface requirements of hearing aid users and wireless earbud users are merging, with many hearing aids allowing Bluetooth streaming and many wireless earbuds allowing control of the user's auditory environment. The limitations of current user interfaces for these devices are holding back their potential as devices that extend human abilities.

Hence, there is a need of a wearable control system to control an ear-worn device in an easy and reliable manner. Particularly, there is a need for a user interface device and method that allows fast, reliable, non-visual control of an ear-worn device.

This objective is attained by the system according to claim 1, the method according to claim 11 and the computer programme according to claim 15. Preferred embodiments are claimed in the sub claims and described hereafter.

A first aspect of the invention is related to a wearable control system configured to control an ear-worn device, particularly a hearable. The wearable control system comprises at least a first processor, wherein the first processor is configured to execute a computer programme stored on a non-transitory storage medium of the system, comprising instructions to provide, generate and arrange a plurality of user-selection elements, and to receive a user input for selecting one or more user-selection elements or to rearrange the user-selection elements.

The wearable control system comprises a wearable remote-control device, wherein the wearable remote-control device comprises a wireless interface configured to communicate with the ear-worn device, and a user interface comprising at least one sensor configured to sense an operation by a part of a hand of a user, and wherein the user interface is configured to output a signal indicative of the detected operation. The first processor is further configured to receive the signal from the user interface and to convert the signal from the user interface into a user input and submit said user input to the computer programme for selecting and/or rearranging the user-selection elements, and to generate and transmit an information about a state of at least one user-selection element of the user-selection elements, particularly upon response from the computer programme, that a selection and/or a rearrangement has been executed, to the ear-worn device causing the ear-worn device to present the information about the state of the at least one user-selection element to the user by auditory display, wherein said auditory display is indicative of the state of the at least one user-selection element.

Particularly, the wearable control system is a wireless wearable control system.

A user-selection element of the plurality of user-selection elements can be an interactive user-selection element. In an embodiment, the user-selection element is a folder. In an embodiment, the user-selection element is a file. The user-selection element can be a list. The user-selection element can be an entry of a list. The user-selection element can be an element of a list. The user-selection element can be a menu. The user-selection element can be an application. The user-selection element can be a function of an application.

A rearrangement of the user selection elements can be a navigation between the user-selection elements. The first processor can be configured to navigate between the user selection elements.

A rearrangement can be related to one user selection element. A rearrangement can be related to a plurality of user selection elements.

A rearrangement of at least two user selection elements can be a change of the arrangement of the two user selection elements relative to each other. It can be a change of the order of the two user selection elements within a list. It can be a change of the distance of the two user selection elements within a list. It can be a change of the number of elements arranged between the two user selection elements within a list. A rearrangement can be an addition of a user selection element in a folder. A rearrangement can be a deletion of a user selection element from a folder.

A rearrangement of a single user selection element can be related to a change of the position of the user selection element with respect to the user. A rearrangement of a single user selection element can be related to a change of the position of the user selection element with respect to a reference. The rearrangement can be a change in the distance between the user selection element and the reference. The rearrangement can be a change of the position of the user selection element relative to the reference. The change of the position of the user selection element relative to the reference can be a change of the distance between the user selection element and the reference. The change of the position of the user selection element relative to the reference can be a change of an angle enclosed by the user selection element and the reference. The change of the position of the user selection element relative to the reference can be a change of the orientation of the user selection element with respect to the reference. The reference can be related to the user, particularly to the head of the user.

According to an embodiment, the user interface is adapted to navigate through menus, wherein the menus are presented to the user by auditory display.

The user selection element can be in a selected state. The user selection element can be in a non-selected state. The information on state of the user selection element can be whether the user selection element is selected or not selected.

The user selection element can be in an executing state. The user selection element can be in a non-executing state. The information on state of the user selection element can be whether the user selection element is in the executing or non-executing state.

The state of a first user selection element can be characterised relative to the state of a second user selection element. The state of a first user selection element can characterise the location of the first user selection element relative to the state of the second user selection element.

The state of a first user selection element can indicate whether the first user selection element is located in front of the second user selection element. The state of a first user selection element can indicate whether the first user selection element is located behind the second user selection element. The state of a first user selection element can indicate whether the first user selection element is located left of the second user selection element. The state of a first user selection element can indicate whether the first user selection element is located right of the second user selection element. The state of a first user selection element can indicate whether the first user selection element is located above the second user selection element. The state of a first user selection element can indicate whether the first user selection element is located below of the second user selection element.

The state of a first user selection element can indicate whether the first user selection element is a sub-unit of the second user selection element. For instance, the first user selection element can be a file arranged in the second user selection element that might be a folder.

The state of a user selection element can change. For instance, the state changes from the non-selected state to the selected state upon selection of the user selection element. The state can change, when a user selection element changes its location. The state can change, when a user selection element is rearranged. The system can be configured to indicate the change of the state by auditory display.

By indicating the particular state, the system can indicate when the user opens a folder. By indicating the particular state, the system can indicate when the user closes a folder.

By indicating the particular state, the system can indicate when the user opens a file. By indicating the particular state, the system can indicate when the user closes a file.

By indicating the particular state, the system can indicate when the user navigates through a menu. By indicating the particular state, the system can indicate a position in a menu, when the user navigates through the particular menu.

By indicating the particular state, the system can indicate when the user opens an application. By indicating the particular state, the system can indicate when the user closes an application.

The at least one sensor can be configured to sense an operation by a hand of a user. The part of the hand of a user can be a finger. The finger can be a thumb. The finger can be an index finger. The finger can be a middle finger. The finger can be a ring finger. The finger can be a little finger. The part of the hand of the user can comprise at least one finger. The part of the hand of the user can comprise two fingers. The at least one sensor can be configured to sense an operation by a finger of a user.

An operation by the part of the hand of a user can be a swiping operation, particularly a swiping operation by a finger of the user. In an embodiment, the operation is a scrolling operation, particularly a scrolling operation by a finger of the user.

In an embodiment, the operation is a waving of the hand. The operation can be a positioning of a plurality of fingers with respect to each other, such as making a first or an "ok-sign" with the hand.

The detected operation by a part of the hand of a user can be used to adjust parameters of the ear-worn device and/or retrieve information from the ear-worn device, when the wearable remote-control device communicates with the ear-worn device. The detected operation by a finger of a user can be used to adjust parameters of the ear-worn device and/or retrieve information from the ear-worn device, when the wearable remote-control device communicates with the ear-worn device.

In an embodiment, the wearable control system comprises a receiving module. The receiving module can be configured to receive the signal from the user interface.

In an embodiment, the wearable control system comprises a transmission module. The transmission module can be configured to transmit an information on a state of at least one user selection element of the user selection elements.

The wearable control system can comprise a microcontroller. The wearable remote-control device can comprise a microcontroller. The first processor can be comprised in the microcontroller.

According to an embodiment the first processor is configured to receive the signal from the user interface via a receiving module, and to convert the signal from the user interface in a user input and submit said user input to the computer programme for selecting and/or rearranging the user selection elements, and to generate and transmit an information on a state of at least one user selection element via the transmission module to the ear-worn device.

According to an embodiment the first processor is configured to receive the signal from the user interface via a receiving module, and to convert the signal from the user interface in a user input and submit said user input to the computer programme for selecting and/or rearranging the user selection elements, and to generate and transmit an information on a state of at least one user selection element via the transmission module to the user interface.

The auditory display can be the use of a sound for the communication from a computing device to the user. The auditory display can be the use of a plurality of sounds, particularly a sequence of sounds, for the communication from a computing device to the user. The auditory display can comprise or consists of an acoustic signal. The information on the state of the at least one user selection element can be indicated by a non-speech sound. The information on the state of the at least one user selection element can be indicated by a speech sound.

The information on the state of the at least one user selection element can be indicated by the sound volume of the auditory display. The information on the state of the at least one user selection element can be indicated by the direction of the origin of the auditory display.

The information on the state of the at least one user selection element can be indicated by the sound pitch of the auditory display. The information on the state of the at least one user selection element can be indicated by the frequency of the auditory display.

The information on the state of the at least one user selection element can be indicated by a single sound. The information on the state of the at least one user selection element can be indicated by sequence of sounds. The information on the state of the at least one user selection element can be indicated by sequence of non-speech sounds and/or speech-sounds.

The user interface comprises at least one sensor configured to sense an operation by a part of the hand of a user, and wherein the user interface is configured to output a signal indicative of the detected operation. The at least one sensor can be configured to sense an operation by a finger of a user, and wherein the user interface is configured to output a signal indicative of the detected operation. The at least one sensor can be a touch sensor. The at least one sensor can be a button.

In an embodiment, the user interface comprises a plurality of components associated to user interface features. The user interface can comprise at least one input unit. The wearable remote-control device can comprise at least one output unit.

The input unit can comprise or consist of the at least one sensor configured to sense an operation by a part of the hand of a user. The input unit can be a tactile button. The input unit can be a touch sensor.

The input unit can comprise or consist of a proximity sensor. The input unit can comprise or consist of an inertial measurement unit. The input unit can comprise or consist of an accelerometer, a gyroscope and/or a magnetometer. In an embodiment, the input unit can comprise or consist of a microphone. The input unit can comprise or consist of a force sensor. The input unit can comprise or consist of a motion sensor. In an embodiment, a microphone is a motion sensor. The input unit can comprise or consist of a tap sensor. In an embodiment, a microphone is a tap sensor.

The output unit can be configured to output a signal indicative of the detected operation. The output unit can comprise or consist of a light emitting diode (LED). The output unit can comprise or consist of a plurality of LEDs. The output unit can comprise or consist of a LED indicator, e.g. a red green blue (RGB) LED indicator. The output unit can comprise or consist of a vibration motor. In an embodiment the output unit comprises or consists of a linear resonance actuator. In an embodiment, the output unit comprises or consists of a loudspeaker. The output unit can comprise or consists of a near field communication module.

According to an embodiment, the output unit is configured to output the auditory display. In an embodiment the wearable remote-control device comprises a wireless radio, e.g. a bluetooth radio, wherein an antenna inside the wearable remote-control device outputs the instruction to the radio inside the ear worn device. The output can be a wireless signal containing the instruction for the ear-worn device to play the auditory display.

In an embodiment, the wearable control system is configured to translate the user input, into a discrete a set of commands. It can be achieved by a combination of hardware layout and software running on the first processor.

In an embodiment, the user interface comprises a touch sensor. The touch sensor may be realised through at least one capacitive sensor, particularly a plurality of capacitive sensors. It may be configured to recognise commands such as: single tap; double-tap; triple-tap; swiping left, right, up or down; scrolling left, right, up or down. According to an embodiment, the touch sensor is configured as a 2-axis grid that allows scrolling simultaneously on the x and y axes.

In an embodiment, the wearable control system, particularly the wearable remote-control device comprises a relatively large, flat surface forming a kind of track pad configured such that the user can scroll in x and y directions with higher resolution.

In an embodiment, the touch sensor input is combined with the linear resonance actuator and associated circuitry to provide a haptic feedback to the user, e.g. conveying acknowledgement of the input commands or providing information about the state of at least one user-selection element of the user-selection elements. According to an embodiment, the linear resonance actuator and associated circuitry is used to convey information to the user independent of the touch sensor via haptic feedback.

According to an embodiment, the wearable control system comprises an inertial measurement unit. The inertial measurement unit can be configured for gesture detection. The inertial measurement unit can be configured for motion detection. The inertial measurement unit can be configured for tap detection. In an embodiment, the inertial measurement unit is configured for fall detection. According to an embodiment, the inertial measurement unit is configured for gesture, motion, tap and fall detection.

According to an embodiment, the proximity sensor is configured to detect a presence and/or a movement of a part of the hand, particularly of a plurality of finger of a user. The proximity sensor can be configured for gesture recognition. In an embodiment, the proximity sensor is configured for gesture recognition independent of the inertial measurement unit. In an embodiment the wearable control system comprises the proximity sensor and the inertial measurement unit, wherein the wearable control system is configured such that both the proximity sensor and the inertial measurement unit are used for gesture recognition, particularly, the combination of the proximity sensor and the inertial measurement unit.

In an embodiment, the wearable remote-control device comprises a wireless radio, e.g. via Bluetooth or Wifi. In an embodiment, the wearable remote-control device comprises a rechargeable battery. The wearable remote-control device can comprise a power management circuitry, particularly including a battery charging circuitry, battery level monitoring circuitry and/or voltage regulation circuitry.

In an embodiment, the user interface is adapted to control the ear-worn device to adapt audio parameters, particularly to control environmental audio.

According to an embodiment, the user interface comprises at least one tactile switch to sense a pressing and/or holding operation in addition to the swiping or scrolling operation.

The remote-control device can comprise a microphone for voice command input.

An advantage of the system according to the invention is that the user can receive information via the auditory display, particularly via a sound. An advantage of the system according to the invention is that the user can receive information via a haptic feedback, particularly via touch. Advantageously, the user can interact with the user interface without looking at it. The need of the visual attention of the user is advantageously reduced. Advantageously, the user is less removed from the environment when receiving information.

In an embodiment, the user interface comprises a haptic feedback mechanism, particularly comprising a linear resonance actuator.

In an embodiment, the user interface comprises a haptic feedback mechanism, particularly based on a linear resonance actuator.

In an embodiment, a linear resonance actuator, combined with a haptic motor driver circuitry is used to provide a multitude of vibration patterns to the user, wherein each pattern can convey a particular information. The particular information can be information about the state of at least one user-selection element of the user-selection elements. Provided information can be related to the input of the user. The associated software can run on the microcontroller. The associated software can run on the first processor.

For example, a vibration in the direction of the left side can denote the endpoint of a list on one end whereas a vibration in the direction of the right side can denote the endpoint at the other end of the list. A sharp vibration can denote a warning or an alert. A slow, weak vibration can denote a gentle reminder.

In an embodiment, the user interface comprises a touch sensor and a haptic feedback mechanism. The haptic feedback mechanism can be based on a linear resonance actuator. In an embodiment, the touch sensor input is combined with the linear resonance actuator and associated circuitry to provide haptic feedback to the user, e.g. conveying acknowledgement of their input commands or that they have come to the end of a list. In an embodiment, the wearable control system is configured to provide information to the user via auditory display in combination with a haptic display.

An advantage is that information can be provided to the user by a combination of a haptic and an auditory feedback. That way, additional information can be provided.

According to an embodiment, the wearable remote-control device is finger-wearable, in particular a ring wearable on a finger, particularly on an index finger, In an embodiment, the wearable remote-control device is a wearable smart finger ring. In an embodiment, the smart finger ring is wearable on the index finger and configured to be operable by the thumb of the same hand of the user.

In an embodiment, the wearable smart finger ring comprises a relatively large, flat surface extended out from the ring to form a kind of track pad configured such that the user can scroll in x and y directions with higher resolution. A power source, particularly a battery, can be concealed in a section of the wearable smart finger ring connecting the track pad to the ring.

Advantageously, an easy handling, particularly one-handed handling of the wearable remote-control device is provided.

In an embodiment, the finger-wearable remote-control device is configured for high comfort. The finger-wearable remote-control can be configured to be ergonomically advantageous. This can increase the convenience of the user. Advantageously, handling mistakes can be reduced. Advantageously, an intuitive handling is achieved.

The wearable smart finger ring can comprise the output unit comprising an LED. LED can be coupled to a light guide that lights up a certain part (or a plurality of certain parts) of the wearable smart finger ring to convey information. In an embodiment, the wearable smart finger ring is configured such that a certain part of the wearable smart finger ring lights up to notify the user that a message has been received. In an embodiment, the wearable smart finger ring is configured such that a certain part of the wearable smart finger ring lights up to indicate the user's 'heart rate zone' during a workout via light colours. The light up can be coupled with the auditory display.

In an embodiment, the wearable remote-control device is a part of a charge case, a small device which fits in a pocket, a wristband, a pendant, a brooch, or a keyring.

The wearable remote-control device can be a part of a charge case of the ear-worn device.

The wearable remote-control device can be a part of a body area network comprising at least one further wearable. The wearable remote-control device can serve as a user interface for a plurality of the wearables of the body area network, particularly all wearables of the body area network.

In an embodiment, the wearable remote-control device comprises at least one biometric sensor.

According to an embodiment, the wearable remote-control device comprises a gesture recognition module based on an inertial measurement unit.

In an embodiment, the wearable remote-control device comprises at least one biometric sensor and a gesture recognition module based on an inertial measurement unit.

The inertial measurement unit can be configured for gesture detection. The inertial measurement unit can be configured for motion detection. The inertial measurement unit can be configured for tap detection. In an embodiment, the inertial measurement unit is configured for fall detection. According to an embodiment, the inertial measurement unit is configured for gesture, motion, tap and fall detection.

According to an embodiment, the wearable remote-control device comprises a proximity sensor. The gesture recognition module can comprise the proximity sensor. The proximity sensor can be configured to detect presence and/or movement of a part of the hand of a user, particularly a plurality of fingers of a user. In an embodiment the wearable remote-control device comprises the proximity sensor and the inertial measurement unit, wherein the wearable remote-control device is configured such that both the proximity sensor and the inertial measurement unit are used for gesture recognition, particularly, the combination of the proximity sensor and the inertial measurement unit.

The wearable remote-control device can comprise one biometric sensor. The wearable remote-control device can comprise a plurality of biometric sensors.

The biometric sensor can be a configured for heart rate measurement. The biometric sensor can be configured for heart rate variability measurement. The biometric sensor can be configured for blood oxygenation measurements. The biometric sensor can be a photoplethysmography sensor. The biometric sensor can be configured to measure the blood volume moved by a heart beat of the user. The biometric sensor can be a heart rate monitor. In an embodiment, the biometric sensor is a contact thermometer. The biometric sensor can be a galvanic skin response sensor. The biometric sensor can be configured to sense the glucose in the blood of the user. In an embodiment, the biometric sensor is a blood glucose sensor. In an embodiment, the biometric sensor is a non-invasive blood glucose sensor.

According to an embodiment, the wearable control system is configured for activity tracking and/or activity monitoring. According to an embodiment, the wearable remote-control device is configured for activity tracking and/or activity monitoring. In an embodiment, the inertial measurement unit is configured for activity tracking and/or activity monitoring. Activity tracking can e.g. comprise tracking of a distance covered, tracking of the number of steps, tracking the calorie consumption, and/or tracking the heartbeat.

In an embodiment, the biometric sensor is configured to detect whether the wearable remote-control device is worn by the user. The system can be configured such that when the biometric sensor determines that the wearable remote-control device is put aside, the wearable remote-control device can go in a low-power mode. Advantageously, the energy consumption is reduced. The system can be configured such that when the biometric sensor determines that the wearable remote-control device is reused, the wearable remote-control device can go from the low-power mode in a normal-power mode.

An embodiment is characterised in that the wearable remote-control device comprises a near field communication module.

The near field communication module can be configured to enable payment via the wearable remote-control device. The near field communication module can be configured to provide identification. The near field communication module can be configured to unlock and/or lock an access system. The near field communication module can be configured to unlock and/or lock a door. The near field communication module can be configured to quickly pair with a further device. The near field communication module can be configured to communicate with a further device.

In an embodiment, the wearable remote-control device comprises the first processor.

According to an embodiment the first processor is comprised in the wearable smart finger ring.

Advantageously, only the wearable remote-control device is required to control the ear-worn device. This is an advantage in situation when the user can only carry a small amount.

According to an embodiment, the wearable control system comprises an intermediary device, wherein the intermediary device is a computing device, particularly a mobile computing device, wherein the intermediary device comprises the first processor.

The intermediary device can be a wearable computing device. The intermediary device can be a mobile phone. The intermediary device can be a smart phone. The intermediary device can be a smart watch. The intermediary device can be a laptop. The intermediary device can be tablet. The intermediary device can be computer, particularly a mobile computer.

In an embodiment, the energy source of the intermediary device is larger than the energy source of the wearable remote-control device.

Advantageously, the power-consuming tasks can be executed by the intermediary device. The energy consumption of the wearable remote-control device is reduced advantageously. The period of use without re-charge can be prolonged.

In an embodiment, the wearable remote-control device is configured to be implantable, particularly implantable under the skin. The wearable remote-control device can be implantable under the skin of a finger.

In an embodiment, the wearable remote-control device is configured to be implantable under the skin of the index finger. Particularly, the wearable remote-control device can be configured to be implantable under the skin of the index finger such that it can be operated by the thumb of the same hand.

An advantage is that the wearable remote-control device is always present. In an embodiment, it harvests energy from the body of the user.

According to an embodiment, the wearable control system is configured to control a further device, particularly wherein the further device is a pair of smart glasses, a smart contact lens, a retina projection device, a virtual reality headset, an artificial reality headset, a computing device, a smart phone, a laptop, a computer, a game console, a hi-fi system, a projector or a car function.

The further device can be a mobile phone.

In an embodiment, the wearable control system is configured to mute and/or unmute a call. In an embodiment, the wearable control system is configured to mute and/or unmute a conference call. In an embodiment, the wearable control system is configured to mute and/or unmute a chat, particularly a club house chat.

In an embodiment the output unit indicates whether the call or the chat is muted/unmuted, particularly by an LED.

In an embodiment, the wearable control system is configured to control a width of a beamformer. In an embodiment, the wearable control system is configured to steer the width of a beamformer. The ear-worn device can have the capability to focus on sound coming from a particular direction, by employing a microphone array with beamforming technology. This, beamformer' has a direction and a width of focus. The wearable control system can be used to steer the direction and control the width of the beamformer.

In an embodiment, the wearable control system is configured to control the configuration of the further device. In an embodiment, the wearable control system is configured to control the display setup of the further device. In an embodiment, the wearable control system is configured to navigate though a menu of the further device. In an embodiment, the wearable control system is configured to navigate though the user settings of the further device. In an embodiment, the wearable control system is configured to lock the further device. In an embodiment, the wearable control system is configured to unlock the further device.

In an embodiment, the wearable control system comprises the ear-worn device, particularly a hearable.

A second aspect of the invention is related to a method for controlling an ear-worn device, particularly a hearable, by a wearable control system, particularly the wearable control system according to the invention, comprising the steps of executing a computer programme stored on a non-transitory storage medium of the wearable control system, comprising instructions to provide, generate and arrange a plurality of user-selection elements, and to receive a user input for selecting one or more user-selection elements or to rearrange the user-selection elements by the first processor, establishing communication between the wearable control system and an ear-worn device via a wireless interface of the wearable remote-control device, detection of an operation by a part of the hand of a user at an at least one sensor of a user interface, outputting a signal indicative of the detected operation by the user interface, receiving the signal from the user interface by the first processor and converting the signal from the user interface into a user input and submitting said user input to the computer programme for selecting and/or rearranging the user-selection elements, and to generate and transmit an information about a state of at least one user-selection element of the user-selection elements, particularly upon response from the computer programme, that a selection and/or a rearrangement has been executed, to the ear-worn device causing the ear-worn device to present the information about the state of the at least one user-selection element to the user by auditory display, wherein said auditory display is indicative of the state of the at least one user-selection element.

According to an embodiment, the information is presented to the user by auditory display, wherein the user interface is adapted to navigate through menus, wherein the menus are presented to the user by auditory display.

An advantage of the method is that information is provided to the user by auditory display such that a visual inspection is not necessary.

The method can also have an advantage for a user that had to keep visual attention on a task but would benefit from being able to access information via audio, or to adjust hearing control settings to compensate for changing noise levels and communication needs. A blind user might get access to applications that were previously only usable with visual interaction.

In an embodiment, the state of the at least one user-selection element is presented to the user by a pre-defined non-speech sound, wherein the pre-defined non-speech sound is indicative of the state of the at least one user-selection element.

According to an embodiment, the state of the at least one user-selection element is presented to the user by a pre-defined speech sound, wherein the pre-defined speech sound is indicative of the state of the at least one user-selection element.

The auditory display can be an acoustic signal. The pre-defined non-speech sound can be a single sound. The pre-defined non-speech sound can be a sequence of sounds. The pre-defined non-speech sound can be a jingle.

The pre-defined speech sound can be a single word. The pre-defined speech sound can comprise a plurality of words. The pre-defined speech sound can be a description, particularly a description of an item.

The information on the state of the at least one user selection element can be indicated by sequence of non-speech sounds and/or speech-sounds.

In an embodiment, the state of the at least one user-selection element is presented to the user by a spatial auditory display.

Via the spatial auditory display, a particular information regarding the state of the at least one user-selection element can be related to the direction of the origin of the auditory display.

Spatial auditory display can be the use of a sound and a spatial aspect of the sound for the communication of from a computing device to the user. The information on the state of the at least one user selection element can be indicated by the direction of the origin of the auditory display. Particularly, information regarding the location of the at least one user-selection element within a list of elements can easily be presented to the user via the spatial auditory display.

For instance, the first element of the list can be characterised by a sound from the left, the last element of the list can be characterised by a sound from the right. When moving through the list from the first element toward the last element, the current position within the list is indicated by the sound moving from the left to the right.

A fast navigation through lists is advantageously provided via spatial auditory display.

In an embodiment, the first element of the list is characterised by a sound coming from the front, the last element of the list is characterised by a sound coming from the back.

A further aspect of the invention is related to a computer programme comprising instructions which when the computer programme is executed by the first processor of the wearable control system according to the invention causes the ear-worn device to present the information on the state of the at least one user-selection element to the user by auditory display, wherein said auditory display is indicative of the state of the at least one user-selection element.

According to an embodiment, the is the computer programme is executed on the wearable smart finger ring. The computer programme can cause the wearable smart finger ring to output a signal that the ear worn device receives. Another computer programme on the ear worn device can play the auditory display.

According to an embodiment, the is the computer programme is executed on the wearable smart finger ring. The computer programme can cause the wearable smart finger ring to output a signal that the intermediary device receives.

Figure 2:
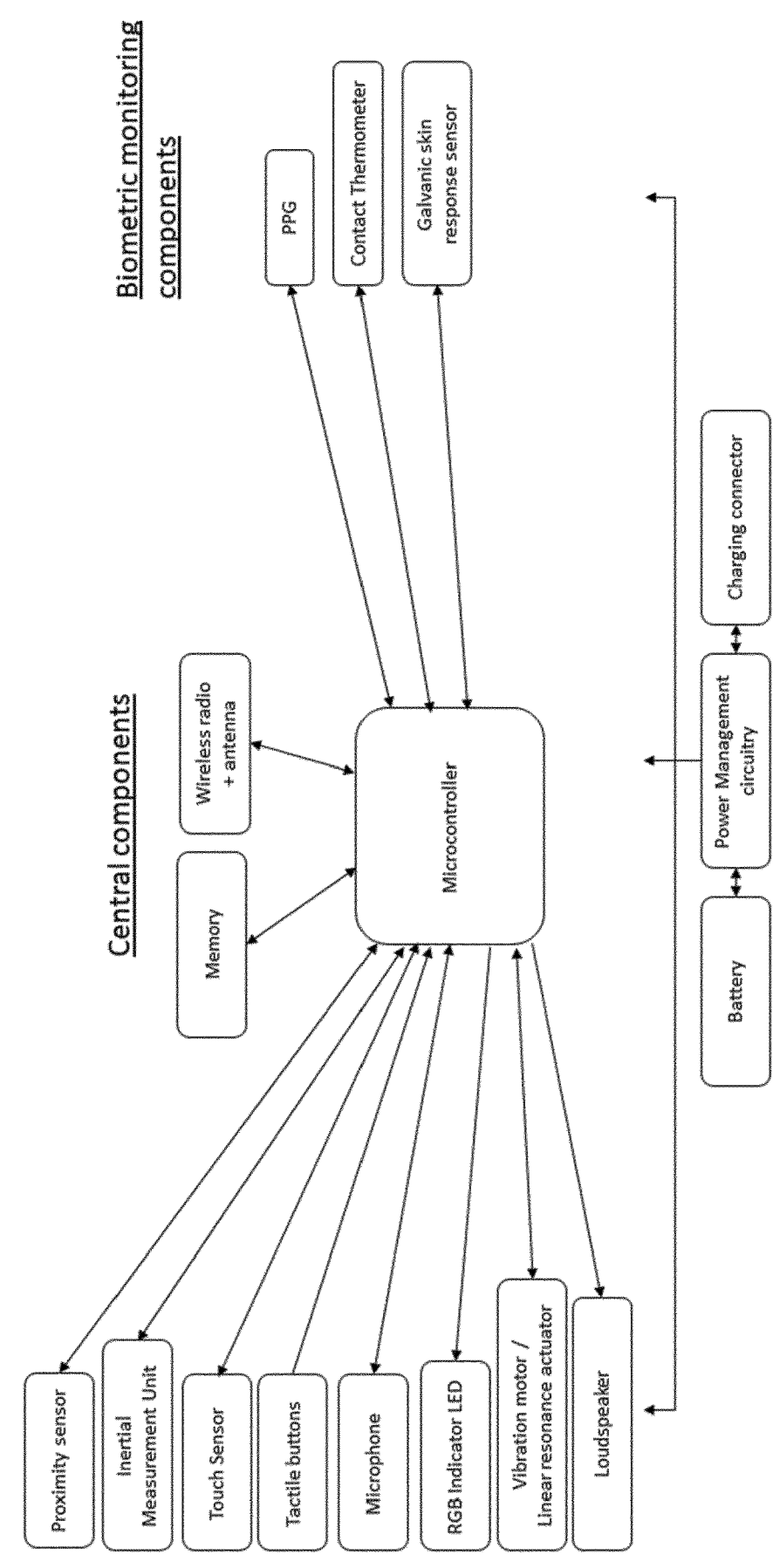
Figure 4:
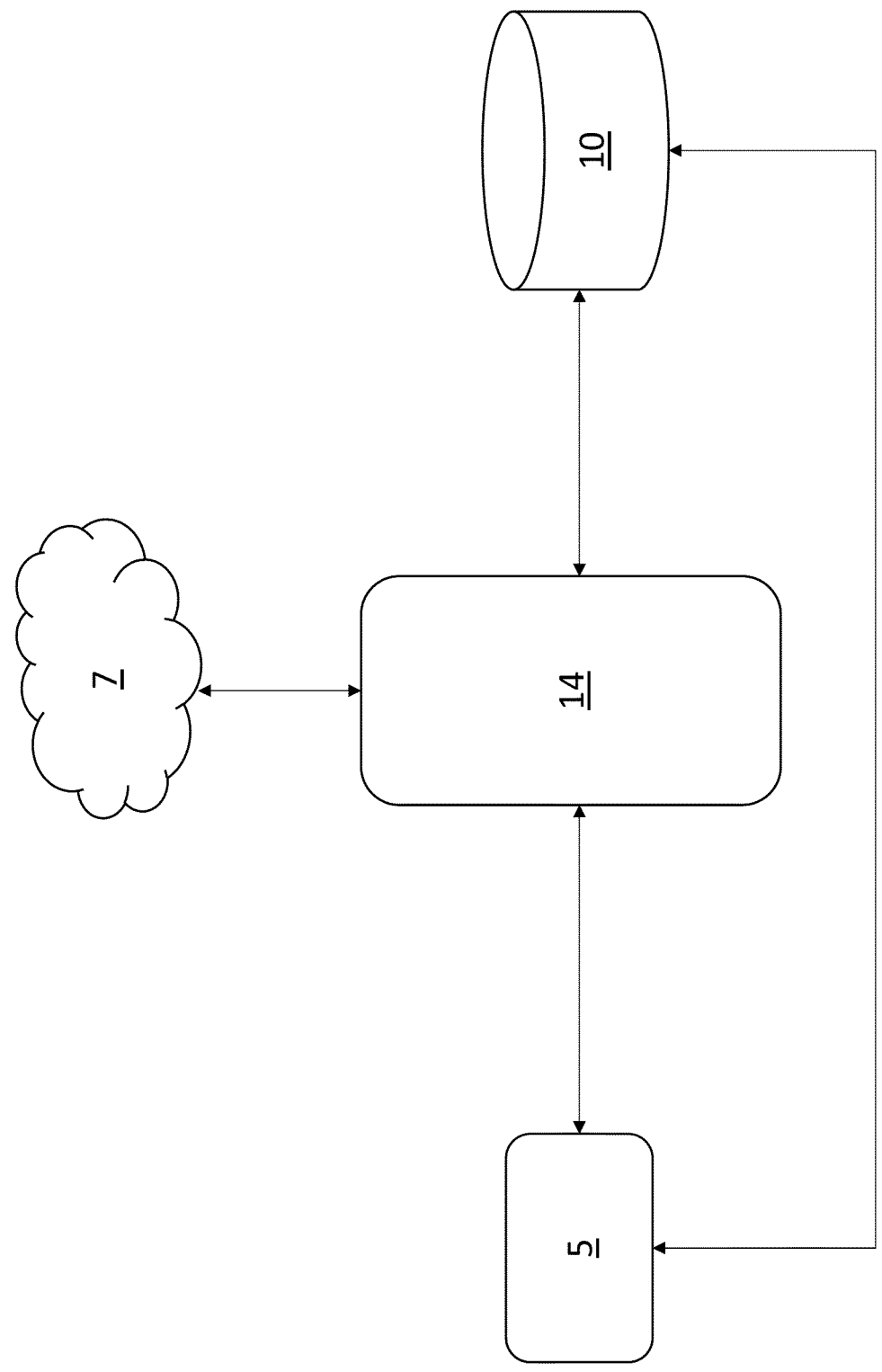
Figure 6:
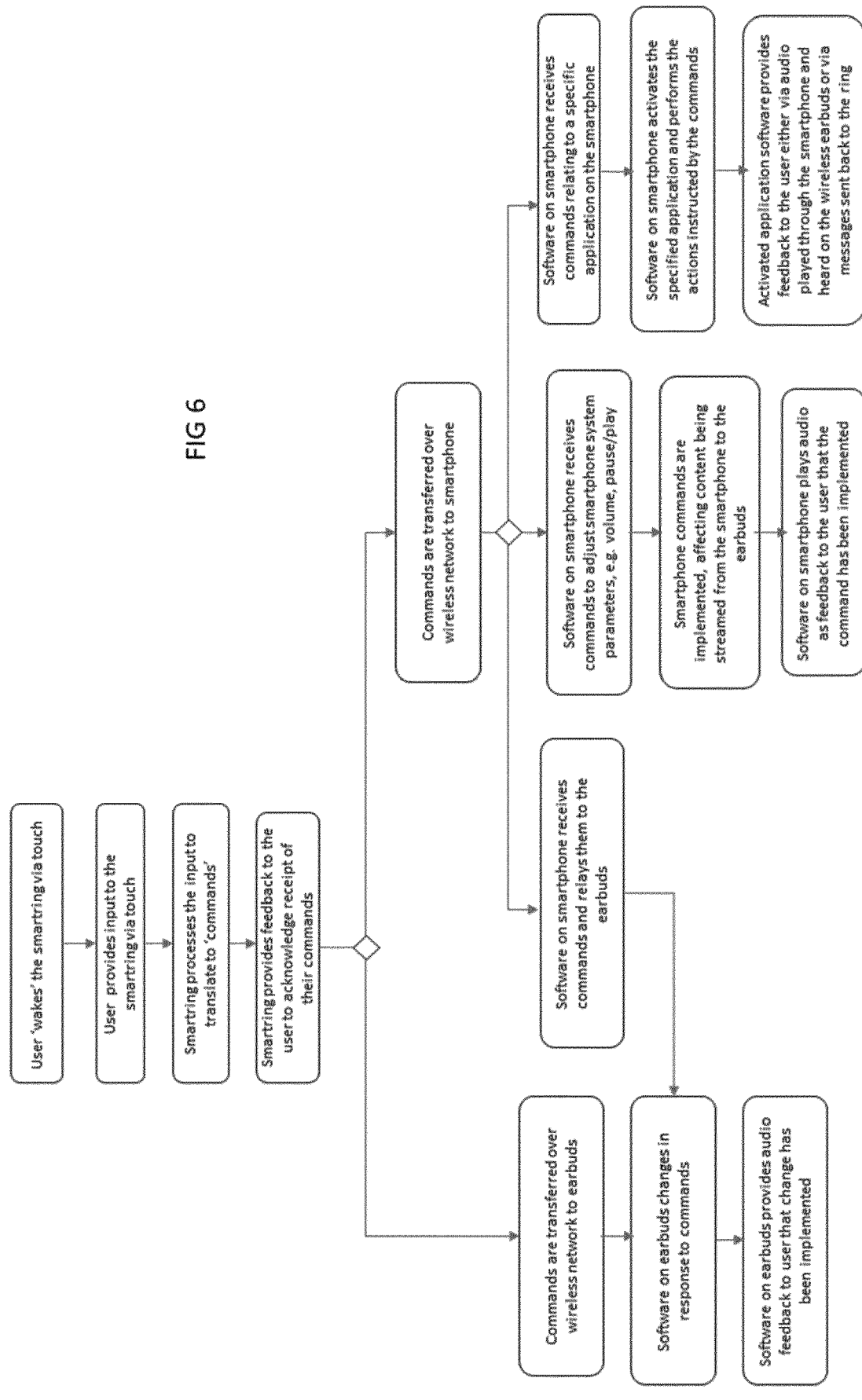
Figure 7:
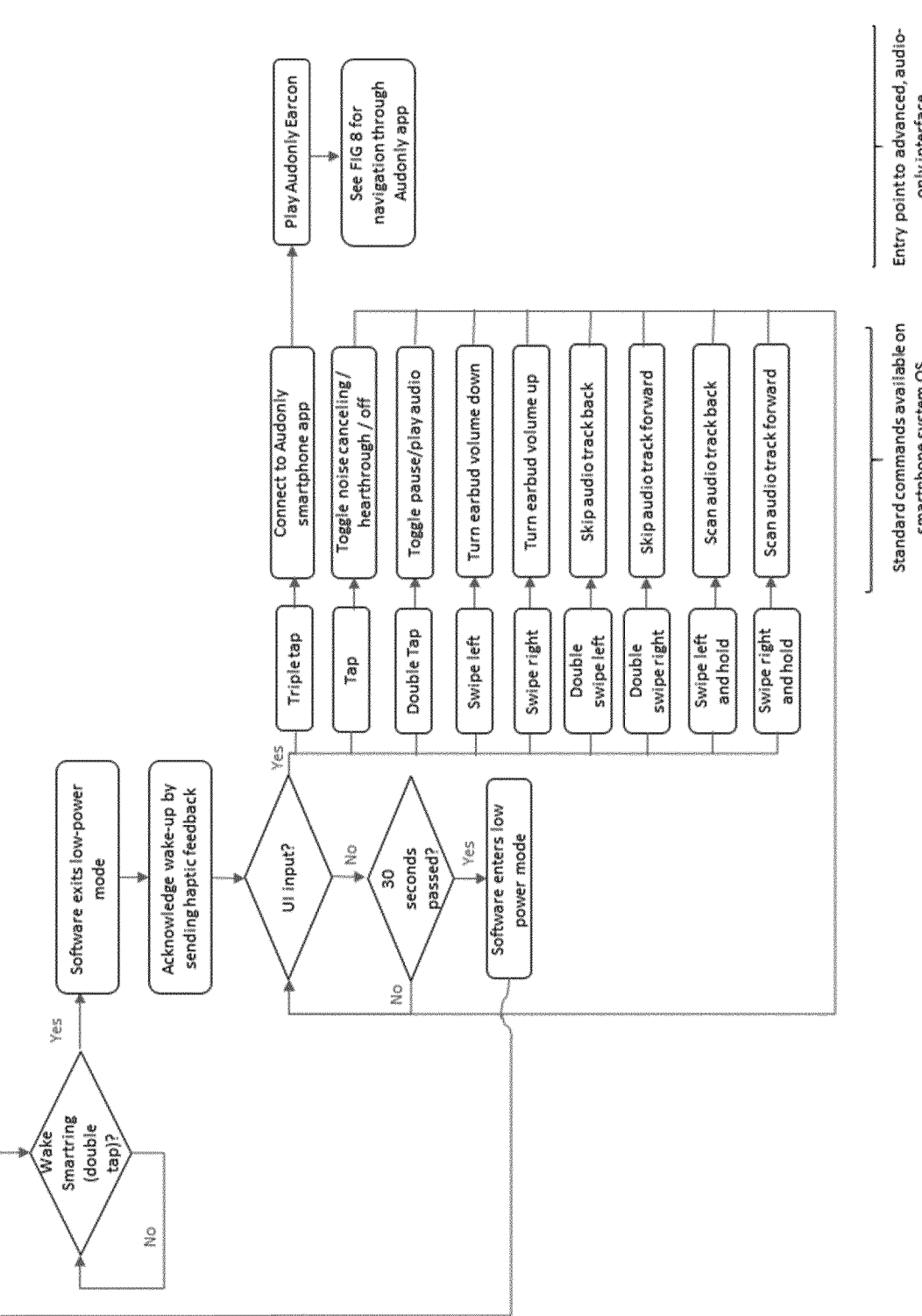
Figure 8:
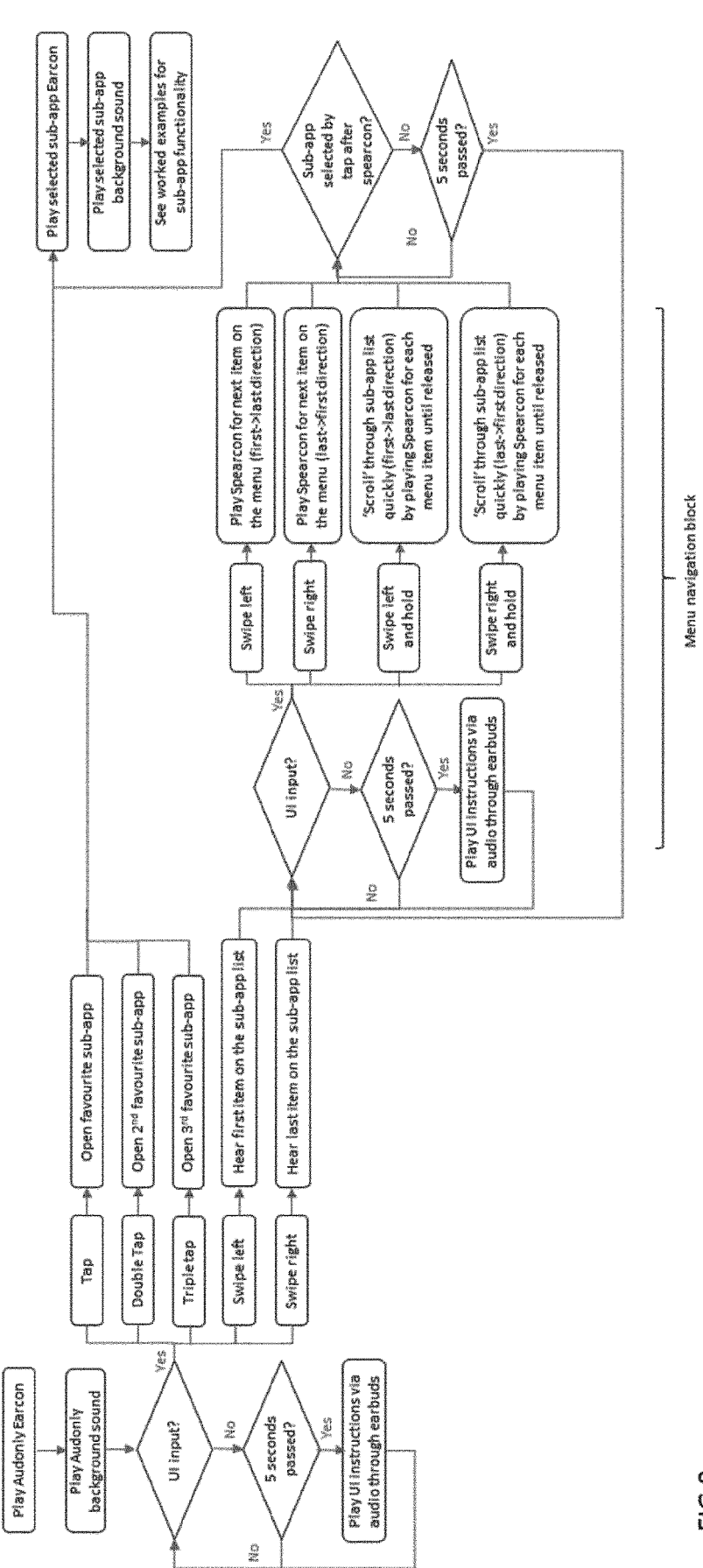
Figures 9, 9A:
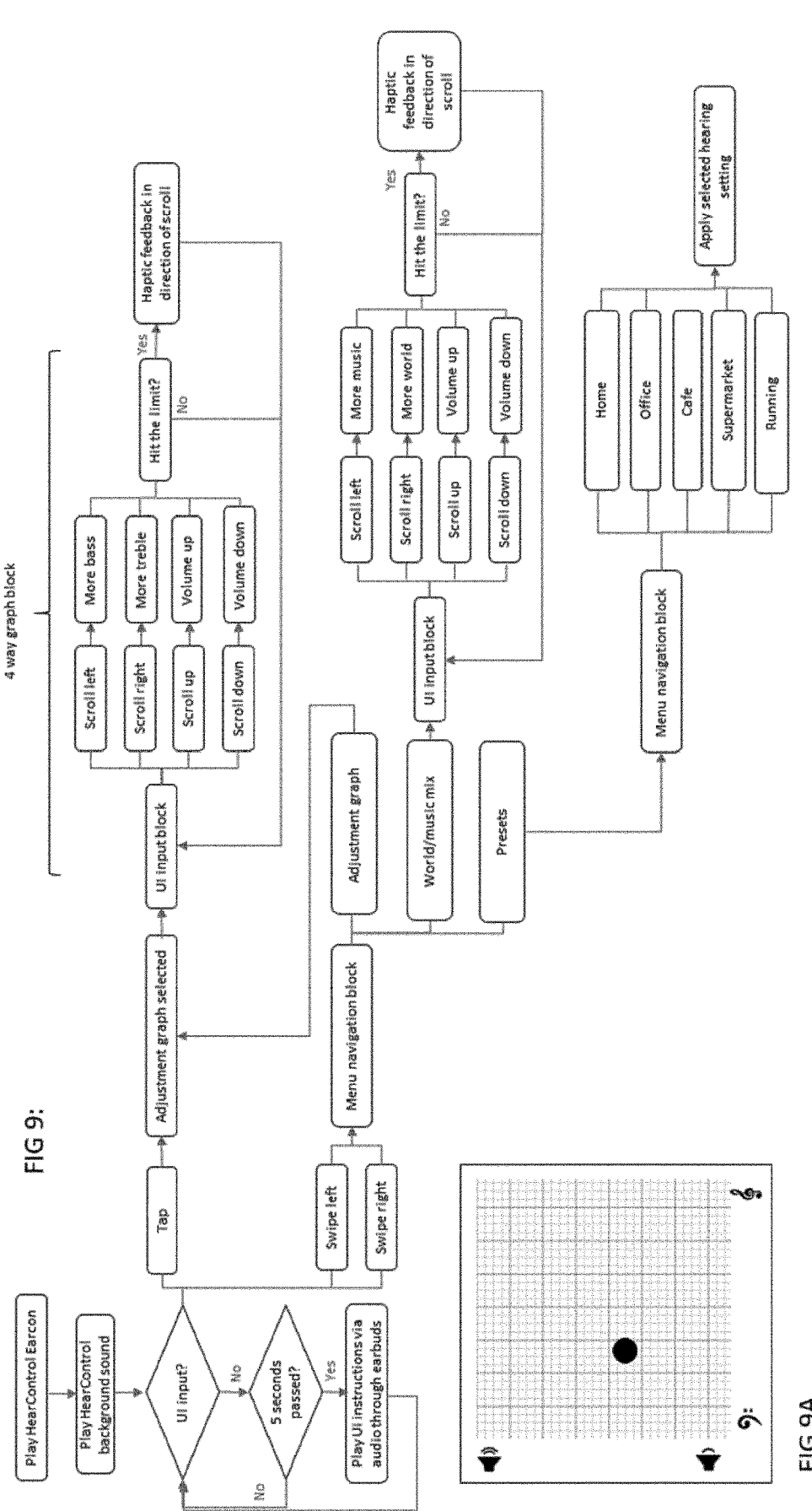
Figure 10:
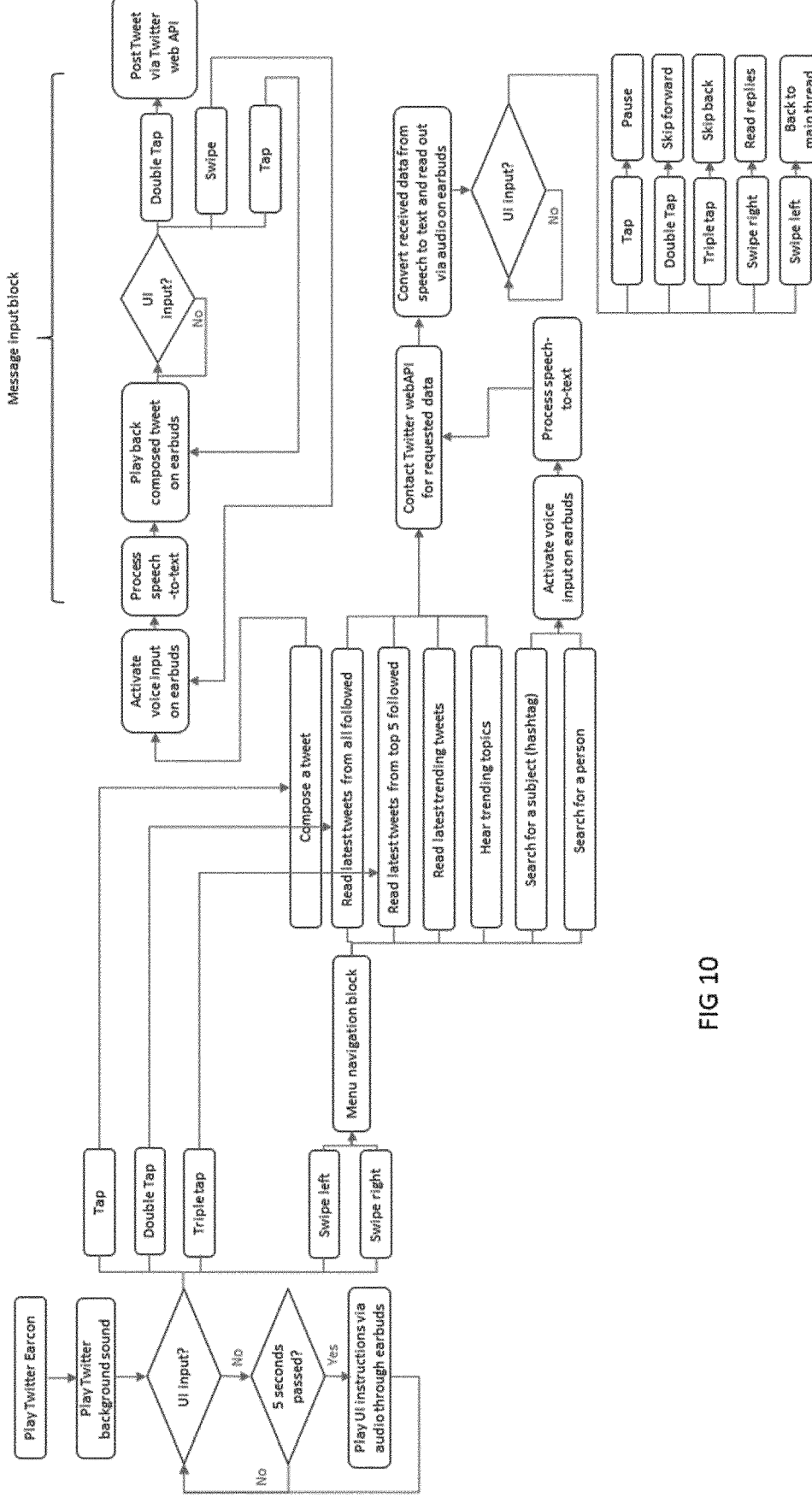
Figure 11:
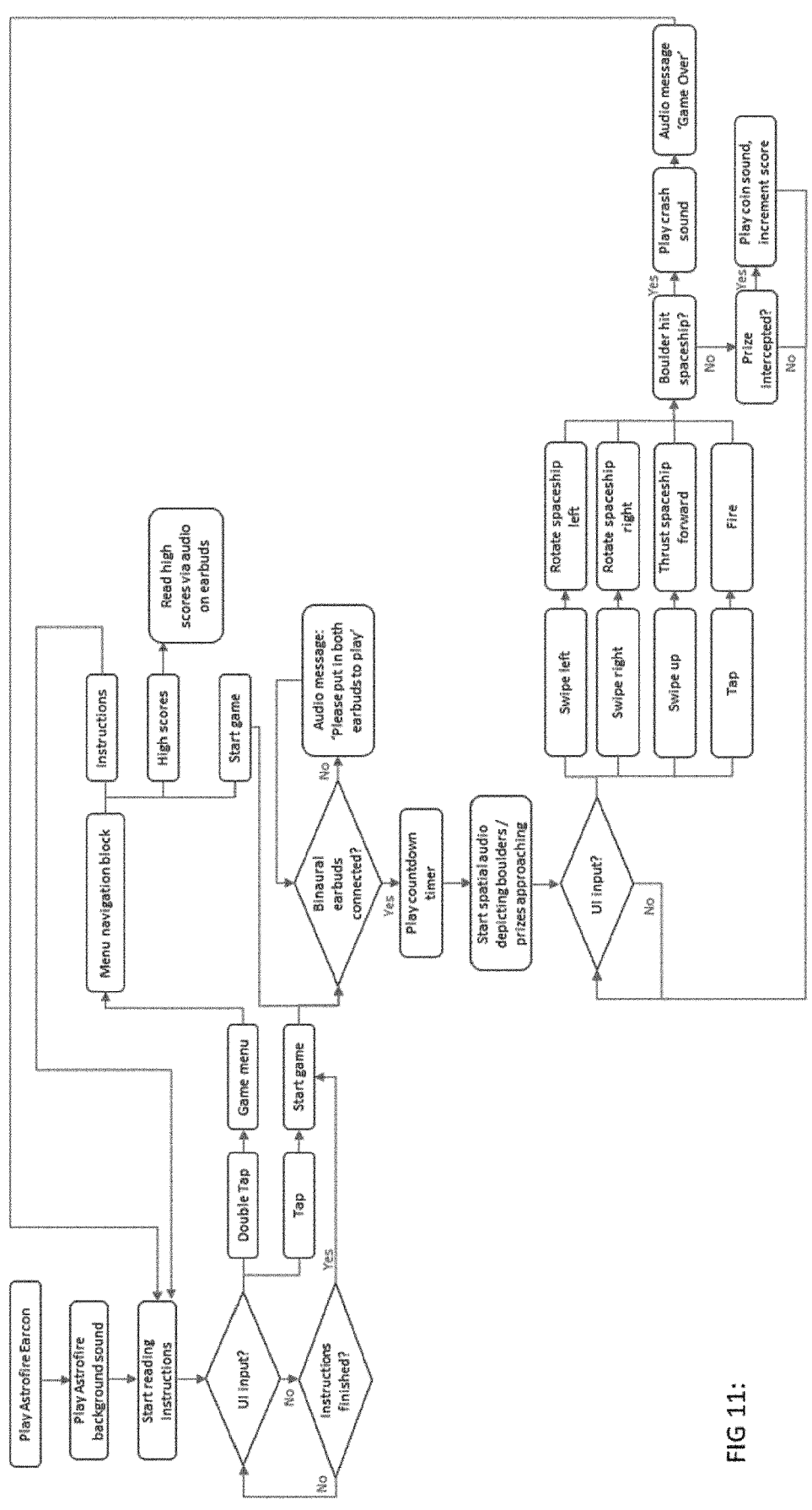
Figure 12:
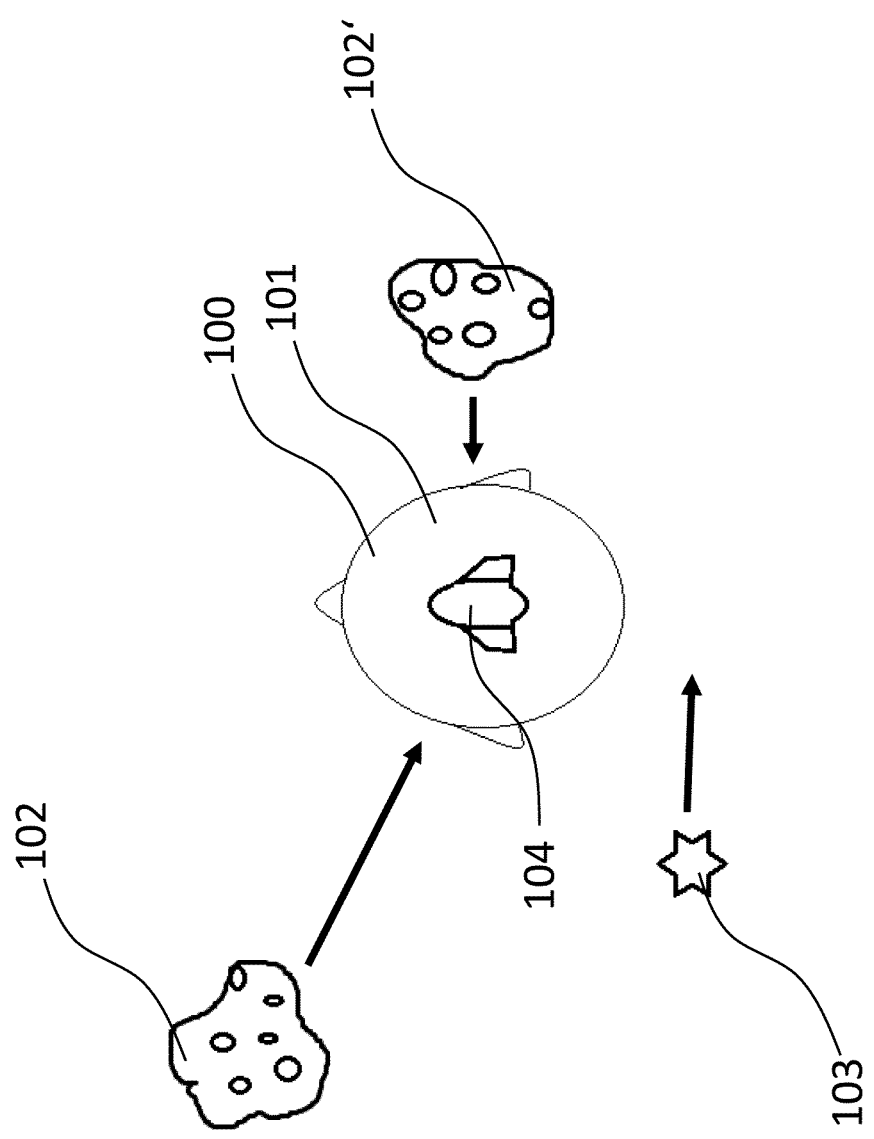
Figures 13, 13A, 13B, 13C:
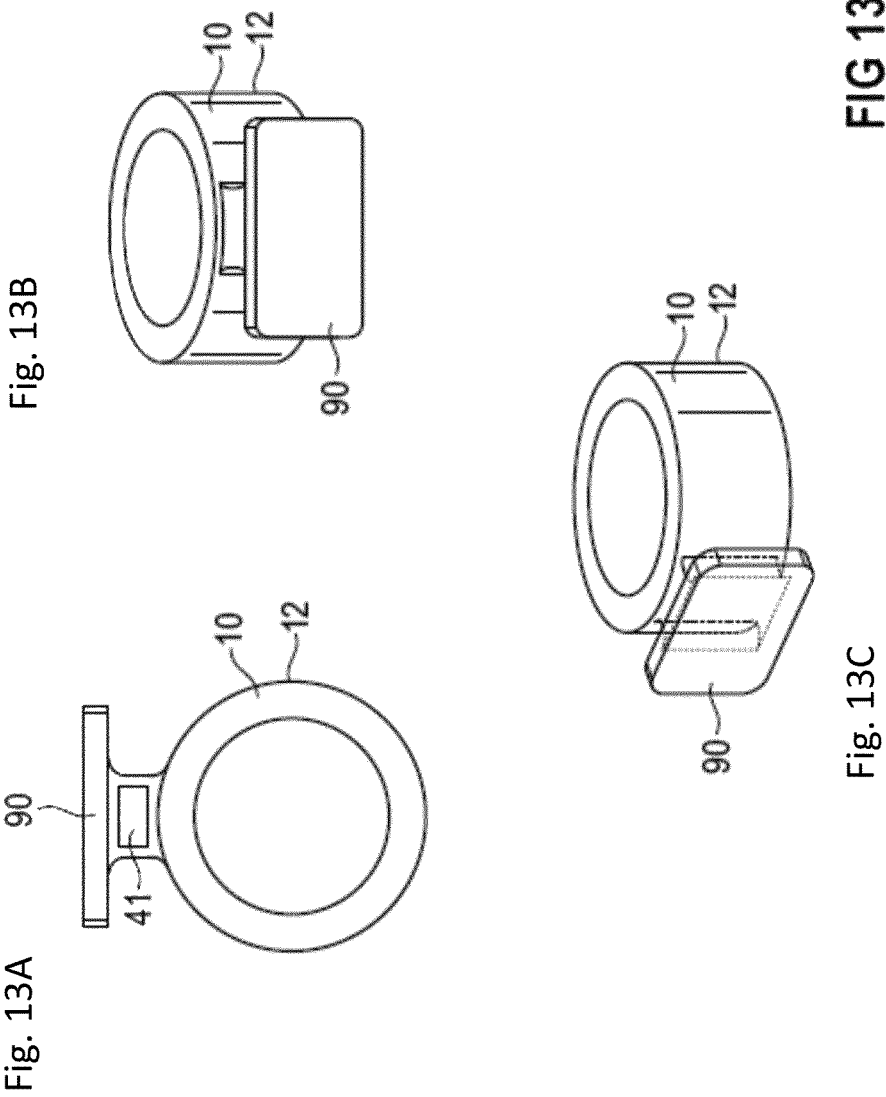

Exemplary embodiments of the invention are described with reference to the Figures, wherein FIG. 1 shows an embodiment of a wearable smart finger ring, FIG. 2 shows a schematic block diagram illustrating components of an embodiment of the wearable remote-control device, FIG. 3 shows an embodiment of a wearable smart finger ring, FIG. 4 shows a schematic block diagram of an embodiment of the wearable control system comprising an intermediary device, FIG. 5 shows a schematic block diagram of an embodiment of the wearable control system, FIG. 6 shows a schematic block diagram of an exemplary communication flow via the system, FIG. 7 shows an example of a basic control of the ear-worn device and calling up the advanced control menu, FIG. 8 shows an example of navigating through an advanced control menu, FIG. 9 shows an example of navigating through an audio-only hearing control app FIG. 10 shows an example of navigating through an audio-only social media app, FIG. 11 shows an example of playing an audio-only game, FIG. 12 shows a visualisation of audio-only 'Asteroids' game, seen from above the user's head, and FIG. 13 shows an embodiment of a 'track pad' extended from the surface of a wearable smart finger ring.

In FIG. 1, an embodiment of a wearable remote-control device 10, particularly a wearable smart finger ring 12 is shown. The illustrated wearable smart finger ring 12 is worn on the index finger 50 of a user. The illustrated smart finger ring 12 comprises a sensor 20. The smart finger ring 12 can comprise three tactile switches 24. The tactile switches 24 can form the input unit 22. FIG. 1A shows the embodiment of the wearable smart finger ring 12 when not being in use. FIG. 1B illustrates when the wearable smart finger ring 12 is worn on the index finger 50 and operated by the thumb 52. Particularly, a tactile switch 24 can be operated by the user by dint of the user's thumb 52.

The wearable remote-control device can comprise one or a plurality of user interface (UI) features realised through electronic components (FIG. 2). UI components can include input features such as tactile buttons, touch sensors, proximity sensors, inertial measurement unit (incorporating accelerometer, gyroscope and magnetometer, or these components independently), microphone and output features such as RGB LED indicator, vibration motor and/or linear resonance actuator, loudspeaker. Configuration of these UI components to translate user input into a discrete set of commands can be achieved by a combination of hardware layout and software running on the first processor, particularly on the microcontroller. Examples of such configurations:

The touch sensor may be realised through capacitive sensors. It may be configured to recognise commands such as: single tap; double-tap; triple-tap; swiping left, right, up or down; scrolling left, right, up or down. It may also be configured as a 2-axis grid that allows scrolling simultaneously on the x and y axes.

The touch sensor input may be combined with the linear resonance actuator and associated circuitry to provide haptic feedback to the user, e.g. conveying acknowledgement of their input commands or that they have come to the end of a list.

The linear resonance actuator and associated circuitry may also be used to convey information to the user independent of the touch sensor via haptic feedback. A linear resonance actuator, combined with haptic motor driver circuitry and software running on the microcontroller can be used to provide a multitude of vibration patterns to the user, each conveying unique information. For example, a vibration in the direction of the left side can denote the endpoint of a list on one end whereas a vibration in the direction of the right side can denote the endpoint at the other end of the list. A sharp vibration can denote a warning or alert. A slow, weak vibration can denote a gentle reminder.

The inertial measurement unit (IMU) may be configured for gesture, motion, tap and/or fall detection.

The proximity sensor may be configured to detect presence and movement of the other fingers, e.g. for gesture recognition, independently of or combined with the IMU.

The wearable remote-control device illustrated in FIG. 2 comprises a first processor. The first processor can be a central processing unit. In an embodiment, the central processing unit is a microcontroller. The wearable remote-control device can comprise a wireless radio, e.g. Bluetooth or Wifi, a rechargeable battery, power management circuitry (including battery charging circuitry, battery level monitoring circuitry and voltage regulation circuitry) and other associated circuitry to support these features.

The wearable remote-control device may comprise biometric sensors such as photoplethysmography sensor (PPG sensor) for heart rate, heart rate variability and/or blood oxygenation measurements, a contact thermometer, galvanic skin response (GSR) sensor. The IMU may be configured for activity tracking. A biometric sensor can be a biometric monitoring component.

In FIG. 3, an embodiment of a wearable remote-control device 10, particularly a wearable smart finger ring 12, according to the invention is presented. In particular, an embodiment of a wearable smart finger ring 12 is shown. In particular, FIG. 3A and FIG. 3B show different perspectives of the upper housing 30. FIG. 3C and FIG. 3D show a flexible printed circuit board and electronic components. In FIG. 3E and FIG. 3F, the lower housing 31 is shown. FIG. 3G and FIG. 3H show the embodiment of a wearable remote-control device 10, 12 comprising the components illustrated in FIG. 3A—FIG. 3F.

The wearable remote-control device 10 can comprise a flexible printed circuit board 40. The wearable remote-control device 10 can comprise electronic components (FIG. 3C, FIG. 3D). It can comprise a power source 41, particularly a rechargeable battery 42. It can comprise a power management circuitry 43 (FIG. 3C, FIG. 3D).

The wearable remote-control device 10 can comprise an output unit 60. The output unit 60 can comprise a LED 62. The exemplarily illustrated wearable remote-control device 10 comprises a central processing unit 70, particularly a first processor 71. The wearable remote-control device 10 can comprise an antenna 72 and/or a radio 73. It can comprise a PPG sensor 25 (FIG. 3C, FIG. 3D).

Further, the wearable remote-control device 10 can comprise programming connector pads 80. It can comprise holes to accommodate programmer.

The wearable remote-control device 10 can comprise three tactile switches 24. The wearable remote-control device 10 can comprise an upper housing 30 and a lower housing 31. The upper housing 30 and a lower housing 31 can be assembled, such that they build the housing of the wearable remote-control device 10 (FIGS. 3G, 3H). The upper housing 30 and/or a lower housing 31 can comprise a locking mechanism configured such that the upper housing 30 and the lower housing 31 remain assembled when the locking mechanism is in its locked position. The locking mechanism can comprise a click mechanism 36 (FIG. 3F).

The upper housing 30 can comprise a flat surface that rests against middle finger for comfort, when the wearable smart finger ring is worn on the index finger (FIGS. 3A, 3B). The lower housing 31 can comprise a through-opening 32 (FIG. 3F). The through-opening 32 can be configured and arranged such that the PPG sensor 25 can enter through the through-opening 32 such that the PPG sensor 25 is accessible (FIG. 3G). In particular, the through-opening 32 can be configured and arranged such that the PPG sensor 25 can have a visual path to the skin of the user when the wearable smart finger ring is worn by the user.

The upper housing 30 can comprise a first recess 38. The lower housing 31 can comprise a second recess 39. The first recess 38 and the second recess 39 can be configured such that a sensor, e.g. a tactile switch 24, is arrangeable in the recess formed by the first recess 38 and the second recess 39, when the upper housing 30 and the lower housing 31 are assembled (FIGS. 3G, 3H).

The lower housing 31 can comprise a corner 35. The corner 35 can be configured to guide a bending of the printed circuit board with the correct bending radius to avoid conductors cracking.

The lower housing 31 can comprise a further opening 33 for programming connector.

FIG. 4 shows a scheme of a system according to the invention. A wearable remote-control device 10, particularly a smart finger ring 12, can communicate with an intermediary device 14, particularly a smart phone. The intermediary device 14 is connectable with the internet 7. The intermediary device 14 can communicate with the ear-worn device 5. The wearable remote-control device 10 and the ear-worn device 5 can communicate with each other via the intermediary device 14. In an embodiment, the wearable remote-control device 10 and the ear-worn device 5 communicate directly with each other.

The intermediary device 14 can be another computing device such as a smartwatch, a laptop or a personal computer.

FIG. 5 shows a scheme of a system according to the invention without an intermediary device. The wearable remote-control device 10 and the ear-worn device 5 can communicate directly with each other. The wearable remote-control device 10 or the ear-worn device 5 can communicate with the internet 7 (FIGS. 5B, 5C).

FIG. 6 shows a schematic block diagram of an exemplary communication flow via the system. A wearable smart finger ring is also referred to as smartring. The smartring may send commands directly to the ear-worn device, also referred to as wireless earbuds, or to the smartphone. In an embodiment, the system is configured such that rather than making this decision each time, the system is configured either by the manufacturer or by the user at setup to use only one of these communication methods.

Examples of specific control tasks performed on the system via user input to the smartring are shown in FIGS. 7, 8, 9, 10 and 11. These examples illustrate how, using a small set of commands called up by user inputs to the device combined with haptic feedback on the device and audio feedback (or auditory display) and voice input on the wireless earbuds, users can have rich and intuitive control of the system without any visual elements.

The complexity of interactions possible with the smartring can be tiered: FIG. 7 shows an example of a list of 8 commands that transfer the capabilities possible on a locked smartphone screen to the smartring, allowing the user to access them without taking out their phone and without looking away from what they're doing. These simple interactions may be sufficient for the needs of a majority of users. The 9th 'triple tap' command can bring the user into a novel interaction environment with more complex possibilities. On their first entry, they can be taken through an audio-only tour of this environment in order to learn how to interact with it.

In the context of the present application, the term 'audio-only' is intended to signify that there is no visual element to the tasks/applications.

'Audonly' can be a novel (particularly smartphone) application that comprises 'sub-apps' to allow audio-only interactions with the system. Sub-apps may be new software applications, e.g. the 'HearControl' sub-app described in FIG. 9, or may be audio-only interfaces for existing software applications, e.g. the Twitter example shown in FIG. 10. The Audonly application can appear on the intermediary device (particularly a smartphone app on a smartphone) like any other app. The user can open it to view installed sub-apps, change settings and/or see tutorials on how to use it with the smartring.

Blocks of elements on the flowcharts that are re-usable are labelled via parentheses and represented by a single element in following figures, e.g. in FIG. 8 a 'Menu Navigation Block' is defined which is re-used in following figures any time a user needs to scroll through menu.

The shown examples illustrate how the method works. For example, the user can always navigate 'back' to a previous menu by pressing and holding the touch sensor, but this is not included in the flowcharts for simplicity.

Techniques from the discipline of auditory display are used in the examples.

Earcons, spearcons and auditory icons are short pieces of audio used to 'sonify' information as a way to make audio communication faster and more intuitive.

Earcons can be pieces of non-speech audio that represent something. Earcons can be used in the presented examples when a new application is entered, in order to notify the user that they are 'in' that application. Earcons can be used when a new application is entered in order for the app developer to somehow stamp their brand in a non-visual environment.

A background sound or music unique to that application may play continuously as long as the user is in the application, so that they remember where they are. This technique can also be used in layers of menus; each menu layer has a different background sound so that the user knows their place in it.

Since humans find it difficult to remember a large number of individual sounds, spearcons can be used in lists in the illustrated examples. Spearcons can contain speech audio (speech sounds) describing the menu item but very briefly and played very quickly.

It is important for users to be able to scroll through long lists quickly. For example, if scrolling through their contacts list to make a phone call, the user may have to scroll through hundreds of contacts. Even with spearcons, this would take a long time if they were to listen to each menu item. In order to allow the user to locate their contact quickly, an alphabetical list can be mapped using spatial audio to a semi-circle that starts on their left side in a particular distance (e.g. 1 m) from their left ear, arcs around the front of their face until it is in a particular distance in front of them (e.g. 1 m), and ends on their right side in a particular distance from their right ear (e.g. 1 m). As an example: the user wants to call a friend, Mary. The user would start at the beginning of the list and hear the spearcon for their first contact, beginning with 'A' on their left side. The user can initiate fast scrolling by swiping right multiple times in quick succession on the touch pad on the smartring. The user can hear a sound move through the described semi-circle quickly. When it moves past the position in front of their face (about half way through the alphabet), the user can swipe left to slow down the scrolling so that the user now hear the individual spearcons. They should now be close to Mary's contact since they are half way through the menu.

In a similar manner, items on a list can be mapped to musical notes, with the first item at the top of an octave and the last item on the bottom of an octave. When the user initiates fast scrolling, they can hear something like a sine sweep. More musically minded users might be able to gauge their place on the list by the tone they are hearing. This may be a good option when spatial audio is not possible, e.g. if the user's HRTF cannot be approximated or if binaural audio is not possible.

The spatial audio and musical scale methods could also be combined.

FIG. 9A illustrates what the user is controlling in 'Adjustment graph'. When scrolling, the user can 'hear' the slider (e.g. a faint beeping) in a 2 dimensional space in front of them. As they move left, the sound moves left, as they move up the sound moves up. This can give the user an indication of where the user is on the grid. A haptic feedback can give an indication of the position in the grid. Particularly, a haptic feedback can give an indication at the endpoints. In an embodiment, the combination of the auditory display and the haptic feedback at the endpoints, gives the user a visualisation of where they are on the grid.

Spatial audio can also be employed to create audio-only games. FIG. 11 shows a worked example of such an audio-only game, based on the 1990's PC game, 'Astrofire'.

The original game began with a spaceship centred on the screen and asteroids coming from different directions. The player must rotate the spaceship to face the incoming asteroid and fire at it to destroy it. The user can also 'thrust' the spaceship forward to adjust position or pick up prizes released from the crumbling asteroids.

In this example, the game is transferred to the audio-only domain with the smartring used as the controller. The controller can require four inputs—left, right, thrust and fire. These functions can be mapped to inputs on the smartring, e.g. four tactile buttons, or a capacitive touch grid that allows swiping (left, right, thrust) and tapping (fire).

The visuals of the game can be mapped to the audio domain using spatial audio. The relative position of the user 100 (or reference 101) and game elements 102, 102', 103, 104 are shown in FIG. 12. The user 100 should feel as though they are in the spaceship 104, so sound from the spaceship should come from inside their head. Incoming asteroids 102, 102' can be perceived via sound coming from a certain direction from the user's head 100, at first far away and quiet and gradually getting closer and louder. The user 100 can use the four control buttons to blow up the asteroid 102 102' before it hits them. Prizes 103 can be represented in the audio domain in a similar manner, using a different sound to differentiate them from asteroids 102, 102'. The user 100 can navigate to collide with the prize 103 in order to win it.

A software development kit may be provided to third parties to enable the creation of many more audio-only sub-apps for the Audonly smartphone application. This would allow creators of existing smartphone applications to create audio-only interfaces that communicate with their web API to bring their service to their users in an audio-only manner.

A software development kit may also be provided for the smartring device to enable developers to customise its functionality.

A development environment may be provided to third parties to guide them in developing audio-only applications combining multi-modal user interface features with auditory display techniques. This may be a no-code platform to enable user-experience professionals to directly develop audio-only applications, as this skillset will be important for the advancement of audio-only.

A start-up sequence may be programmed into the system such that when the smartring is first set up, the user is taken through tutorial explaining functions and giving examples of auditory display features that may be unfamiliar to them.

The methods described may have particular applications for a blind user, since it may bring the user access to applications that were previously only usable with visual interaction.

The methods described may also have many applications in workplaces, for example in industrial workplaces where workers need to keep their visual attention on a task but would benefit from being able to access information via audio, or to adjust hearing control settings to compensate for changing noise levels and communication needs.

The methods described may have particular applications for drivers, who need to keep their visual attention on the road and surroundings but may want to interact, for example, with the music system in their car.

FIG. 13 shows different views (FIGS. 13A-C) of an embodiment of the wearable remote-control device 10, particularly a smartring 12. The smartring 12 may comprise a relatively large, flat surface extended out from the ring to form a track pad. The track pad can be a capacitive touch grid 90, which is configured such that the user can scroll in x and y directions on a grid. The power source 41 (particularly the battery) can be concealed in the part connecting the track pad to the ring.

The invention claimed is:

1. A wearable control system configured to control an ear-worn device, wherein the wearable control system comprises at least a first processor, wherein the first processor is configured to execute a computer programme stored on a non-transitory storage medium of the system, comprising instructions to provide, generate and arrange a plurality of user-selection elements, and to receive a user input for selecting one or more user-selection elements or to rearrange the user-selection elements, a wearable remote-control device, wherein the wearable remote-control device comprises a wireless interface configured to communicate with the ear-worn device, and a user interface comprising at least one sensor configured to detect an operation by a part of a hand of a user, and wherein the user interface is configured to output a signal indicative of the detected operation, wherein the first processor is further configured to receive the signal from the user interface and to convert the signal from the user interface into a user input and submit said user input to the computer programme for selecting and/or rearranging the user-selection elements, and to generate and transmit an information about a state of at least one user-selection element of the user-selection elements, upon response from the computer programme, that a selection and/or a rearrangement has been executed, to the ear-worn device causing the ear-worn device to present the information about the state of the at least one user-selection element to the user by auditory display, wherein said auditory display is indicative of the state of the at least one user-selection element, wherein the wearable remote-control device is finger-wearable or wherein the wearable remote-control device is a part of a charge case, a small device which fits in a pocket, a wristband, a pendant, a brooch, or a keyring.

2. The wearable control system according to claim 1, wherein the user interface comprises a haptic feedback mechanism.

3. The wearable control system according to claim 1, wherein the wearable remote-control device is a ring wearable on a finger.

4. The wearable control system according to claim 1, wherein the wearable remote-control device comprises at least one biometric sensor and/or wherein the wearable remote-control device comprises a gesture recognition module based on an inertial measurement unit.

5. The wearable control system according to claim 1, wherein the wearable remote-control device comprises a near field communication module.

6. The wearable control system according to claim 1, wherein the wearable remote-control device comprises the first processor.

7. The wearable control system according to claim 1, wherein the wearable control system comprises an intermediary device, wherein the intermediary device is a computing device, wherein the intermediary device comprises the first processor.

8. The wearable control system according to claim 1, wherein the wearable remote-control device is configured to be implantable.

9. The wearable control system according to claim 1, wherein the wearable control system is configured to control a further device, wherein the further device is a pair of smart glasses, a smart contact lens, a retina projection device, a virtual reality headset, an artificial reality headset, a computing device, a smart phone, a laptop, a computer, a game console, a hi-fi system, a projector or a car function.

10. The wearable control system according to claim 1, wherein the wearable control system comprises the ear-worn device.

11. A method for controlling an ear-worn device, by a wearable control system, according to claim 1, comprising the steps of executing a computer programme stored on a non-transitory storage medium of the wearable control system, comprising instructions to provide, generate and arrange a plurality of user-selection elements, and to receive a user input for selecting one or more user-selection elements or to rearrange the user-selection elements by the first processor, establishing communication between the wearable control system and an ear-worn device via a wireless interface of the wearable remote-control device, detection of an operation by a part of a hand of a user at an at least one sensor of a user interface, outputting a signal indicative of the detected operation by the user interface, receiving the signal from the user interface by the first processor and converting the signal from the user interface into a user input and submitting said user input to the computer programme for selecting and/or rearranging the user-selection elements, and to generate and transmit an information about a state of at least one user-selection element of the user-selection elements, upon response from the computer programme, that a selection and/or a rearrangement has been executed, to the ear-worn device causing the ear-worn device to present the information about the state of the at least one user-selection element to the user by auditory display, wherein said auditory display is indicative of the state of the at least one user-selection element.

12. The method according to claim 11, wherein the state of the at least one user-selection element is presented to the user by a pre-defined non-speech sound, wherein the pre-defined non-speech sound is indicative of the state of the at least one user-selection element.

13. The method according to claim 11, wherein the state of the at least one user-selection element is presented to the user by a pre-defined speech sound, wherein the pre-defined speech sound is indicative of the state of the at least one user-selection element.

14. The method according to claim 11, wherein the state of the at least one user-selection element is presented to the user by a spatial auditory display.

15. A non-transitory computer-readable medium encoded with a data structure comprising instructions which, when the is executed by the first processor of the wearable control system according to claim 1, causes the ear-worn device to present the information on the state of the at least one user-selection element to the user by auditory display, wherein said auditory display is indicative of the state of the at least one user-selection element.

\* \* \* \* \*